April 14, 1964     J. L. CLARK     3,128,473
METHOD FOR FORMING GLOVES FROM VINYL FILM OR SHEETING
Filed April 26, 1961     5 Sheets-Sheet 1

INVENTOR
JAMES L. CLARK

BY
*Wright & Wright*

ATTORNEYS

April 14, 1964   J. L. CLARK   3,128,473
METHOD FOR FORMING GLOVES FROM VINYL FILM OR SHEETING
Filed April 26, 1961   5 Sheets-Sheet 2

INVENTOR
JAMES L. CLARK

BY Wright & Wright

ATTORNEYS

April 14, 1964 J. L. CLARK 3,128,473
METHOD FOR FORMING GLOVES FROM VINYL FILM OR SHEETING
Filed April 26, 1961 5 Sheets-Sheet 3
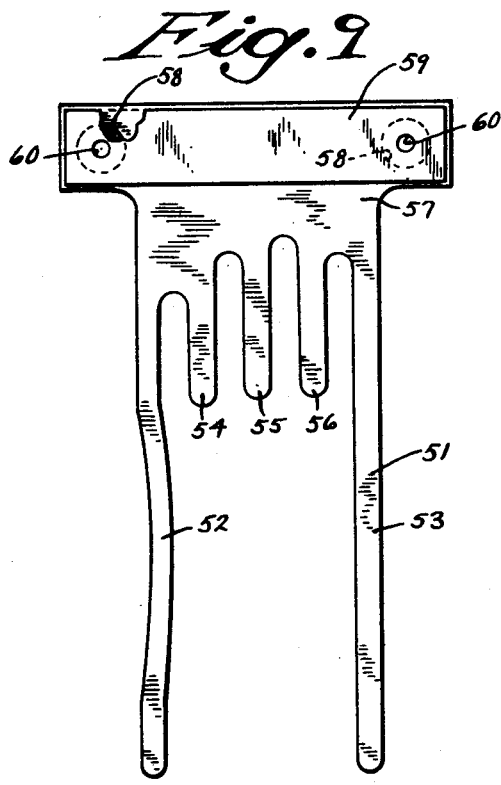
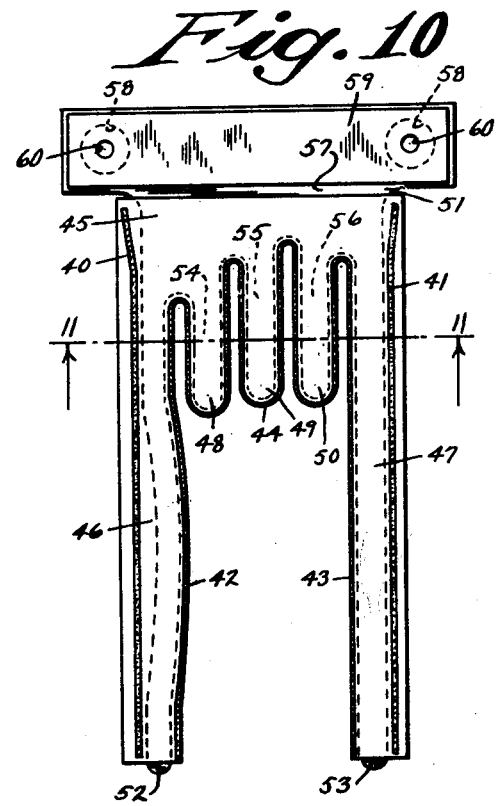
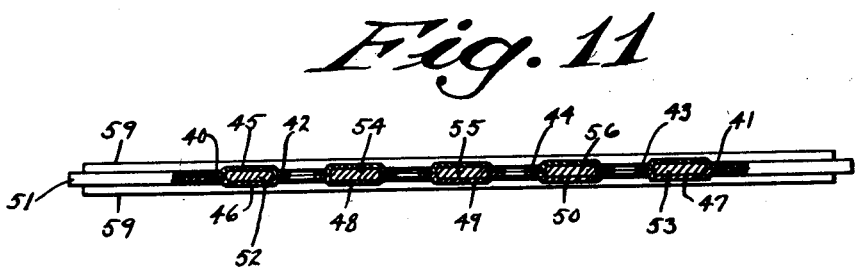
INVENTOR
JAMES L. CLARK
BY *Wright & Wright*
ATTORNEYS April 14, 1964    J. L. CLARK    3,128,473
METHOD FOR FORMING GLOVES FROM VINYL FILM OR SHEETING
Filed April 26, 1961    5 Sheets-Sheet 4

INVENTOR
JAMES L. CLARK

BY
ATTORNEYS

April 14, 1964      J. L. CLARK      3,128,473
METHOD FOR FORMING GLOVES FROM VINYL FILM OR SHEETING
Filed April 26, 1961      5 Sheets-Sheet 5
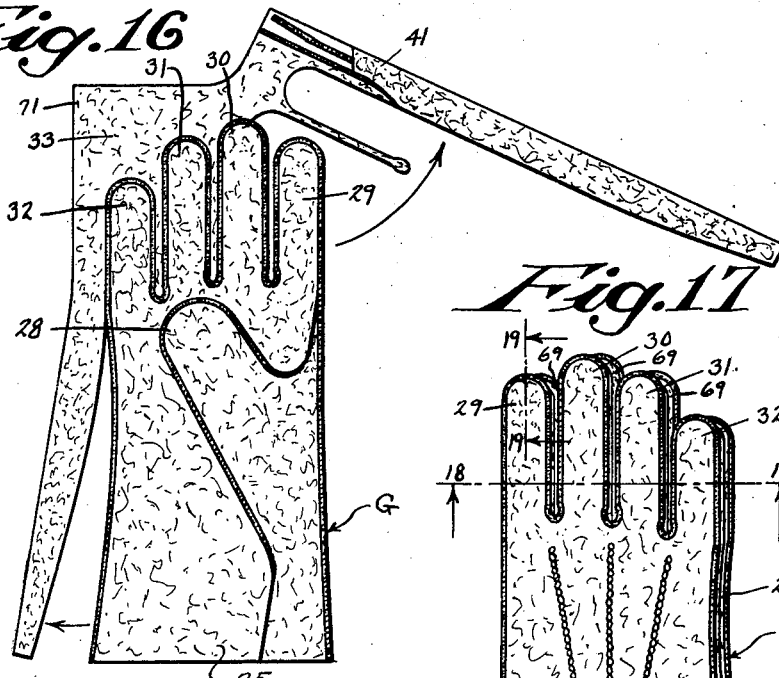
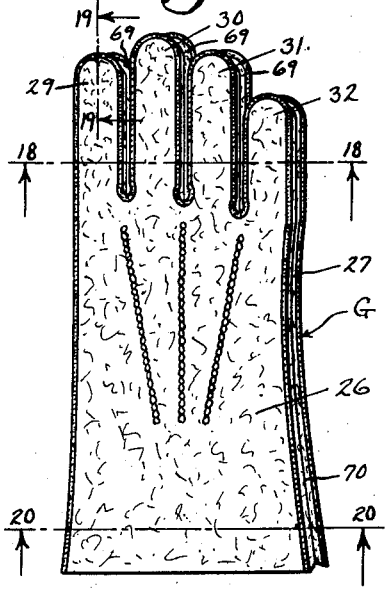
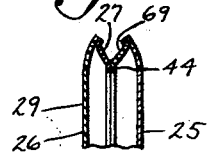
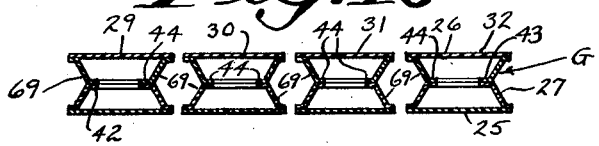
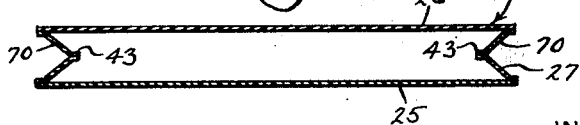
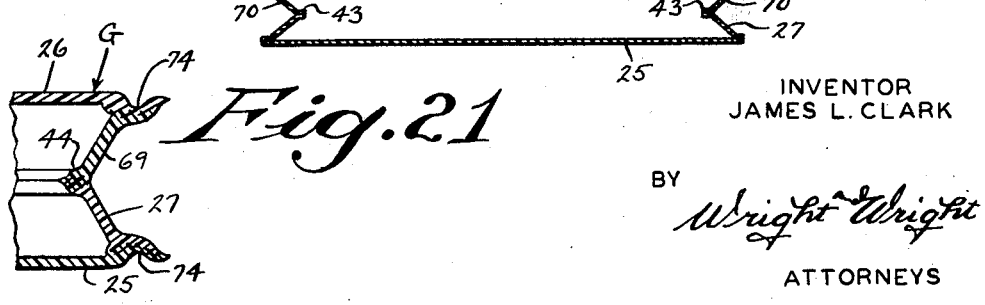
INVENTOR
JAMES L. CLARK
BY
*Wright & Wright*
ATTORNEYS United States Patent Office 3,128,473
Patented Apr. 14, 1964

3,128,473
METHOD FOR FORMING GLOVES FROM VINYL FILM OR SHEETING
James L. Clark, Milwaukee, Wis., assignor to Mark-Clark, Inc., Milwaukee, Wis., a corporation of Wisconsin
Filed Apr. 26, 1961, Ser. No. 105,596
4 Claims. (Cl. 2—169)

The invention appertains to the art of making gloves and more particularly to a novel method and means for making gloves or the exterior shells of gloves from vinyl or like thermoplastic film or sheeting.

It is customary to form mittens from vinyl film and usually the palm and back sections are die cut from sheets of film and the marginal edges of the film are electronically welded together. The mittens are provided with a fabric lining and the film forms a waterproof shell for the complete mitten. Obviously, the electronic welding of marginal edges of two sheets of film does not present a problem and the expeditious and economical welding of the mitten shell blanks is easily accomplished. Such a mitten is shown in my pending application S.N. 857,370, filed December 4, 1959, now Patent No. 3,088,118, dated May 7, 1963, and in that application, I illustrated a means for electronically welding to the back and palm sides of a gauntlet, thermoplastic pieces, without the welding of the back and palm sections together to form a channel for a continuous elastic band.

Attempts have been made to produce a fingered glove from vinyl film and all of these attempts with which I am familiar, have produced unsatisfactory welds either on the palm or back side of the glove resulting in weak and unsightly welds.

These gloves apparently utilize the well-known thin slip sheets of dielectric material for preventing the making of unwanted welds and in so doing, it is necessary to seal these filmsy sheets within a welded fourchette assembly. After this assembly has been welded to the back and palm sections of the glove the slip sheets are then removed from the glove.

One of the primary objects of my invention is to provide means for forming independent and complete tear seals or welds on both sides of the glove and completely around the fingers and the palm and back sections, by using independent electronic welding electrodes or dies for the opposite sides of the glove, with each die working against the opposite sides of a floating press bed, whereby perfect seals will be made on both sides of the glove to give a stronger glove with a more finished appearance.

Another salient object of my invention is to provide a novel gusset assembly for forming gussets on all sides of the fingers and at the sides of the glove, with novel means for simultaneously forming, by means of upper and lower electronic welding electrodes or dies, all of the tear seals or welds of the glove itself with one operation of an electronic welding machine.

A further object of my invention is to provide a novel floating press bed formed from a single plate of rigid material which is coated or covered on both sides with a dielectric substance for receiving a complete gusset assembly, with like die welding electrodes carried respectively by a lower base plate and a movable upper die plate, so that the two die electrodes operating against the opposite sides of the stacked glove parts (palm, back and gusset assembly) and the floating press bed will accurately make independent strong finished seals or welds on opposite sides of the glove, with one simultaneous operation.

A further important object of my invention is the provision of novel means including the two welding die electrodes and the floating press bed for simultaneously forming (on each side of the glove) a double merging weld consisting of an outer tear seal or weld and an inner seal, not only to insure the making of a firm and desired weld but to also add to the appearance of the glove by simulating a stitch line on opposite sides of the glove.

A still further important object of my invention is to provide a floating press bed carrying the gusset assembly from which the glove can be readily stripped after completion, so that the floating press bed can be continuously used and thereby eliminate the necessity of sealing a slip sheet in an assembly and then removing the slip sheet from a completed glove.

Another still further object of my invention is to provide a novel means for forming a complete gusset assembly itself from flat sheets of vinyl film or sheeting by means of die electrodes which form tear seals, whereby the assembly can be torn or separated from the sheets ready for receiving the floating press bed.

With these and other objects in view, the invention consists in the novel construction, arrangement and formation of parts as will be hereinafter more specifically described and claimed, and illustrated in the accompanying drawings, in which drawings, FIGURE 1 is a top plan view of the initial blank from which the palm and one thumb side is formed, the view showing in dotted lines the outline of the tear seal when the blank is electronically welded to a thumb blank;

FIGURE 9 is a top plan view of my novel floating press bed;

FIGURE 10 is a top plan view showing the floating press bed inserted within the gusset assembly;

FIGURE 11 is a transverse sectional view taken on the line 11—11 of FIGURE 10, looking in the direction of the arrows, the view being on a larger scale than FIGURES 9 and 10;

Figure 13:
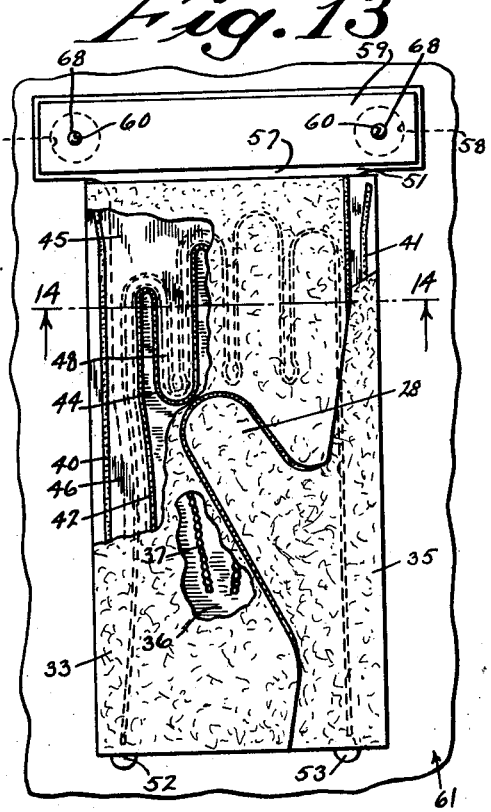
FIGURE 13 is a fragmentary top plan view showing the assembling of the glove back blank, the gusset assembly with its floating press bed and palm blank with its thumb on the lower die welding electrode.
Figure 14:
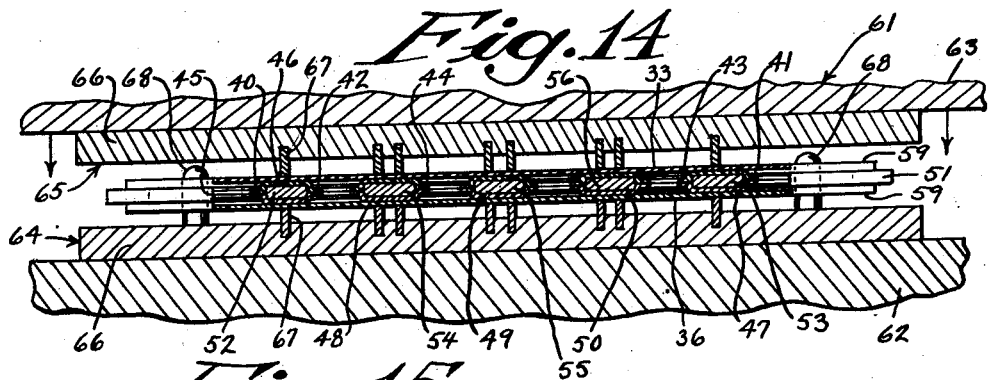
Figure 15:
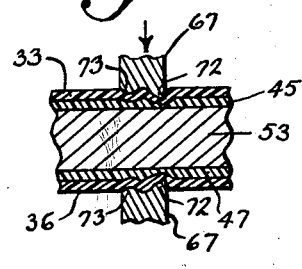

FIGURE 14 is a fragmentary transverse sectional view showing the matching upper and lower die welding electrodes being brought together and against the stacked glove parts, and on opposite sides of the floating press bed to bring about the forming of independent desired welds on the opposite sides of the glove without the welding of parts of the back and palm together, the upper and lower die welding electrodes being shown carried by a lower base plate and a movable upper mounting plate, the section being taken substantially on the line 14—14 of FIGURE 13, and on a greater scale than FIGURE 13;

FIGURE 15 is a fragmentary magnified sectional view through a part of the upper and lower die welding electrodes, floating press bed and adjacent glove parts showing more particularly the formation of the die electrodes to bring about the merging tear seals and welds to give a desired finished appearance to the glove with independent welds on opposite sides of the glove;

FIGURE 16 is a top plan view showing a completed glove being torn along the tear seals to remove the same from the remaining parts of the vinyl film;

FIGURE 17 is a top plan view showing the reverse side of a completed glove from that shown in FIGURE 16;

FIGURE 18 is a transverse sectional view through the fingers of the glove taken on the line 18—18 of FIGURE 17, the view showing the gussets welded to the palm and back sections of the glove;

FIGURE 19 is a detail longitudinal sectional view through the terminal end of one finger of a glove showing the gusset at the finger terminal, the section being taken on the line 19—19 of FIGURE 17, looking in the direction of the arrows;

FIGURE 20 is a transverse sectional view through the wrist portion of the glove taken on the line 20—20 of FIGURE 17, looking in the direction of the arrows, and FIGURE 21 is a fragmentary detail sectional view through one side of one finger of the glove on a highly enlarged scale to illustrate the merging weld and tear seals at the margin of the glove and fingers.

Referring to the drawings in detail, wherein similar reference characters designate corresponding parts throughout the several views, the letter G generally indicates (see FIGS. 16 and 17), a glove made in accordance with my method and apparatus. All parts of the glove are made from thermoplastic film or sheeting, such as vinyl film. Different weights or thicknesses of film or sheeting can be used as might be found desirable by a manufacturer, and one face, the outer face, of the film can be embossed or otherwise suitably treated to give a desired effect to please the aesthetic taste of the trade, and the film or sheeting can be of any desired selected color or combination of colors, printed or unprinted, embossed or unembossed, etc. Thus the film or sheeting can be made to simulate glove leather or the like. The glove, as shown, actually forms an exterior shell and the shell can be provided with a fabric lining, and the term glove as utilized includes either a complete glove without a lining or an exterior shell for the reception of a lining.

As illustrated, the glove G includes a front face or palm section 25, a rear face or back section 26, and a connecting center section 27 constituting gussets for the fingers and sides of the glove. Thus, the front and back sections are completely connected around the entire margin thereof by the center section, and again, such center section constitutes the gussets to give fullness and an attractive appearance to the glove.

The glove includes a thumb portion 28, an index finger portion 29, a middle finger portion 30, a ring finger portion 31 and a little finger portion 32. The thumb portion 28 actually constitutes a part of the palm or front section 25 and is carried thereby as will hereinafter more fully appear.

In accordance with the method pursued the various sections of the glove are made from blanks or tranks and the blanks are treated and electronically welded together.

Figure 1:
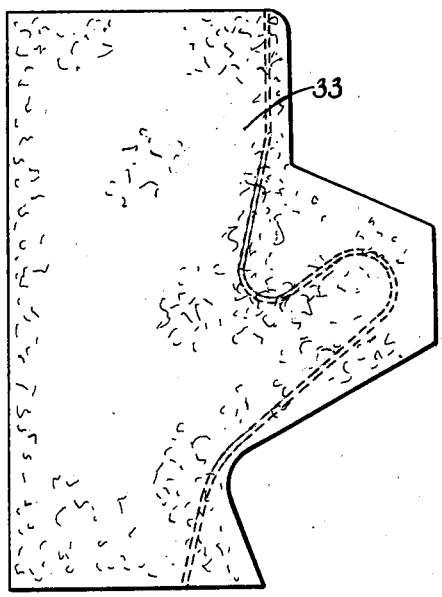
Figure 2:
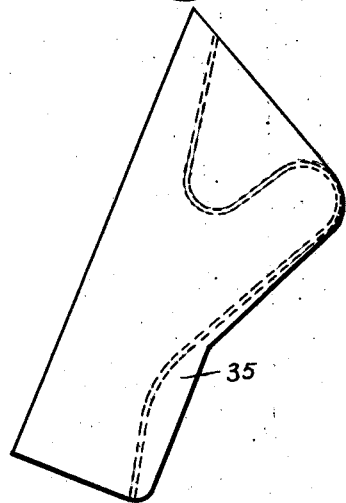
FIGURE 2 is a plan view of the initial blank from which the other side of the thumb and part of the palm side is formed, the view showing in dotted lines the outline of the tear seal when the two blanks are electronically welded together by a tear seal.

Now referring to the method, I utilize an initial palm blank 33 and this blank is die cut to provide a lateral extension 34 which extension later forms one side of the thumb of the glove upon the completion of the blank. A separate thumb blank 35 in its initial form is die cut (see FIG. 2), and is utilized to form the other side of the thumb after the blanks are electronically welded together by a tear seal, as will now be set forth. The blank 35 is placed on the inner side of the blank 33 and the finished side of the blank 35 is disposed outermost. The blanks 33 and 35 are now electronically welded together by a tear seal shown in dotted lines in FIGURES 1 and 2. This electronic welding is accomplished in the usual and well known manner. After the completion of the electronic weld a discard portion (not shown) is torn from the united blanks along the tear seal, leaving a completed blank for a further welding operation, as will also later appear.

The back section 26 of the glove is formed from a blank 36 and the blank can be of an oblong shape in plan and may or may not be provided with embossed lines 37 to simulate stitching.

Figure 8:
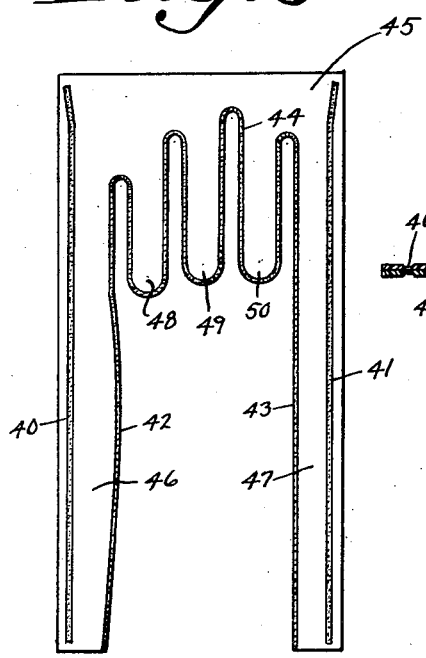
FIGURE 8 is a top plan view of the complete gusset assembly ready for use removed from the welded sheets by tearing along weld tear seal lines.
Figure 7:
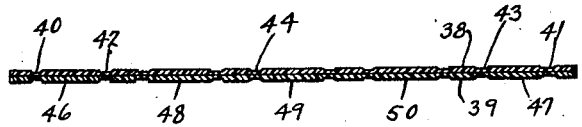
FIGURE 7 is a transverse sectional view through the welded sheets taken on line 7—7 of FIGURE 6, looking in the direction of the arrows.

The center section 27 of the glove is initially formed from blanks 38 and 39 of a like size and shape and of a dimension appropriate for the size of the glove being made, and these blanks can be of an oblong shape in plan and the same are placed one upon the other with their finished faces innermost. The blanks are now electronically welded together to form tear seals and the electronic welding takes place along substantially longitudinally extending outer parallel lines 40 and 41 adjacent to the marginal side edges of the blank. The electronic sealing also takes place between the seal lines 40 and 41 to unite the blanks along outer spaced lines 42 and 43 which extend from one end edge of the blanks toward the other end edge of the blanks. The seal lines 42 and 43 are connected by a sinuous seal line 44 for a purpose, which will now appear. As heretofore stated, the electronic weld lines form tear seals and the central part of the blanks between the weld lines 42 and 43 and sinuous weld line 44 is torn out leaving a gusset or center assembly, now indicated by the reference character 45 (see FIG. 8). The seal lines 40 and 41 and seal lines 42 and 43 and their connecting sinuous seal line 44 define side sleeves 46 and 47 and short, intermediate pockets 48, 49 and 50. It is to be noted that the pockets 48, 49 and 50 are all closed at their outer ends.

The sheets 38 and 39 are electronically welded together to create the tear seals by the usual electronic welding machines commonly used in the trade.

The blank sections 33 and 36 and gusset assembly 45 are all brought together in a certain specified manner and electronically welded together in accordance with my method and apparatus, which will now be set forth.

Figure 12:
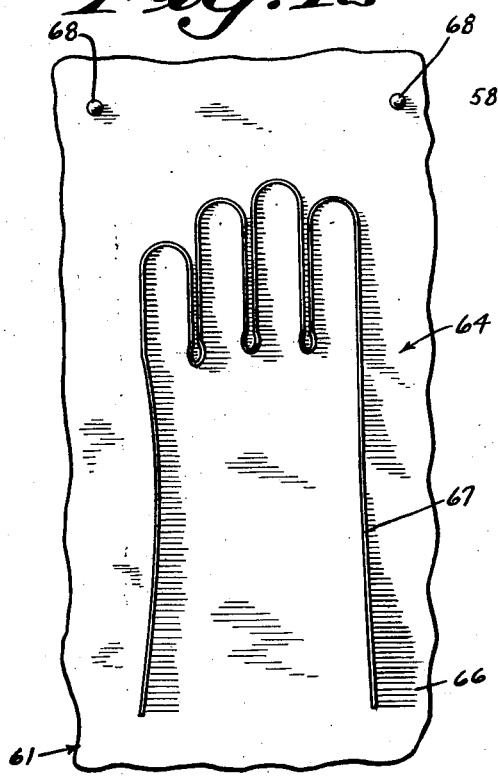
FIGURE 12 is a fragmentary top plan view of the lower die welding electrode.

My novel apparatus includes a floating press bed 51 (see FIGS. 9 and 10), and this floating press bed is formed from rigid electric conducting material coated on both sides with a good electric insulating substance. The floating press bed 51 must have sufficient strength and rigidity to withstand the pressure from the dies making contact both on the top and on the bottom, as will now be set forth. The floating press bed 51 conforms in general outline to the shape of the center assembly 45 and thus includes side flat prongs 52 and 53 and intermediate short flat prongs 54, 55 and 56. All of the prongs 52, 53, 54, 55 and 56 are formed on a connecting base 57 to form the integral floating press bed. The prong 52 can be slightly arched. Where the floating press bed 51 is formed from metal its connecting base can be provided with enlarged openings 58 and these openings are covered by upper and lower blocks 59 of dielectric material which extend substantially the full width of the base. The blocks 59 are provided with openings 60 of a relatively smaller diameter than the openings 58 and the openings 60 constitute locating holes for placing the same upon the lower electronic welding die, which in turn, is associated with an electronic welding machine, a fragment of which is shown in FIGS. 12, 13 and 14, and indicated by the reference character 61. While I have shown upper and lower blocks 59, it is to be understood that a single block can be used on one side only if such should be desired.

Figure 3:
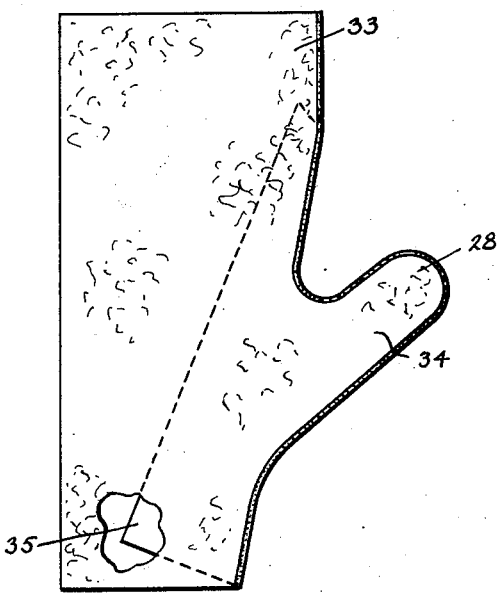
FIGURE 3 is a top plan view showing the palm and thumb blanks electronically welded together by a tear seal with the discard portion torn therefrom.
Figure 4:
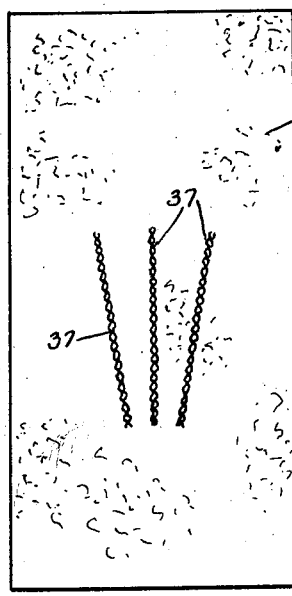
FIGURE 4 is a top plan view showing the back section of the glove or blank.
Figure 5:
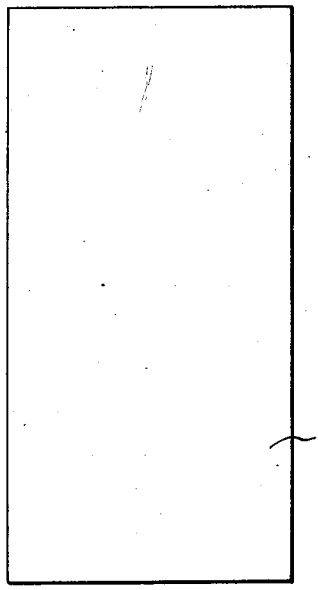
FIGURE 5 is a top plan view showing film or sheeting blanks from which the gusset assembly is formed.
Figure 6:
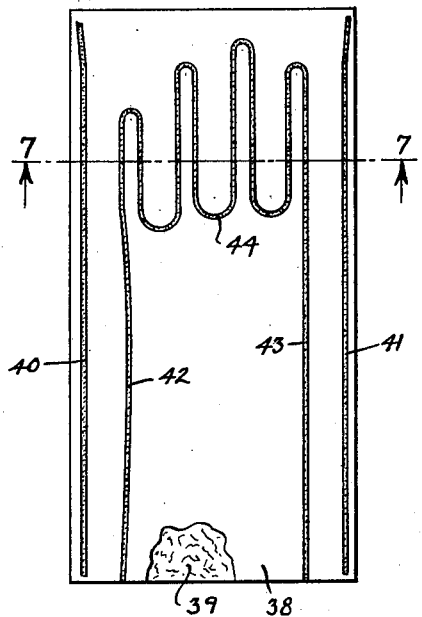
FIGURE 6 is a top plan view showing sheets electronically welded together by tear seals to define the gusset assembly.

The floating press bed 51 constitutes a means (as one of its functions), for receiving and holding the gusset assembly 45 in correct position between the palm blank 33 as shown in FIGURE 3, and the back glove blank 36, as shown in FIGURE 4. Thus, the bed has its side prongs inserted in the sleeves 46 and 47 of the gusset assembly and the intermediate bars 54, 55 and 56 inserted within the pockets 48, 49 and 50 of the assembly during the forming of the glove and this is best shown in FIGURES 10 and 11.

Now referring to the apparatus of which the floating press bed 51 forms a salient part, the same includes a lower base plate 62, and an upper movable die mounting plate 63. In accordance with my invention the base plate 62 receives and holds the lower welding die electrode 64 and the upper mounting plate carries the upper welding die electrode 65. The die electrodes 64 and 65 are of a mirror image of one another, and the dies are so located on the lower die base plate 62 and upper mounting plate 63 as to each exactly match or mate when the mounting plate 63 is lowered toward the electrode or die 64 and the floating press bed 51. Each die 64 and 65 includes a carrying plate 66 having rigidly secured thereto or formed therein the die electrode 67 per se. This die electrode 67 is shaped to conform to the complete outline of a glove, including the index, middle, ring and little fingers. Its outer edge is shaped in a particular manner, as will be later set forth.

The lower electrode can be provided with locating pins 68 and at the proper time the floating press bed with the gusset assembly thereon is placed on the pins 68 and the pins 68 extend through the openings 60 in the blocks of insulation 59. The press bed 51 is free to ride up and down on the pins 68 and hence has the desired floating action.

I have only shown a fragment of the electronic welding machine, in that, the machine is of the general type now employed in the electronic welding art, and my contribution to the welding machine consists in the floating press bed 51 and the provision of independent upper and lower matching die electrodes 64 and 65 operating on the opposite sides of a floating press bed.

With the die electrodes in place, the blank 36 is placed on the lower die electrode 64 in proper position with the outer finished surface thereof lowermost. The floating press bed 51 with the gusset assembly 45 is now placed in position on top of the back blank, after which the finished palm blank 33, as shown in FIGURE 3, is spread out and placed on the gusset assembly and the floating press bed, as best shown in FIGURES 13 and 14. The upper welding electrode is now lowered and brought into intimate contact with the blank 33 and with th bringing of the die electrode 67 into intimate contact with the palm blank 33, the floating press bed is forced downward into intimate contact with the back blank 36, with the back blank 36 pressed into intimate contact with the welding surface 67 of the lower electrode 64. The high frequency current is now released and the upper and lower independent welds are formed to secure the blank sections and gusset assembly together in their proper relationship to form a complete glove, as now will be set forth. Upon the completion of the upper and lower independent welds, the current is broken and after a cooling period the upper electrode is moved to a raised position.

At this time, it is well to note that the electrodes form the welds at intermediate points longitudinally of the sleeves and pockets of the gusset assembly and that these welds are of the tear and seal type, hence tear seals are formed intermediate the longitudinal edges of the gusset assembly sleeves and pockets so that these sleeves and pockets will be divided by tear seals and the sleeves and pockets are separated into sections along said tear seals. Thus, the opposite sides of the sleeves and pockets form gussets 69 for the fingers and gussets 70 for the sides of the glove. It can be seen that the gussets 69 not only extend at the sides of the fingers but also at the tips or terminals thereof as best shown in FIGURE 19.

The welded glove can now be removed from the machine and the glove is stripped off of the floating press bed and the floating press bed is ready for use with another stacked glove assembly. The glove as removed from the floating press bed 51 is shown in FIGURE 16, and the glove is torn along the tear seals leaving a discard section numbered 71 in FIGURE 16, and this discard section includes parts of the palm and back sections and parts of the gusset assembly. The complete glove removed from the discard section is best shown in FIGURE 17. Obviously, the finger gussets 69 and side gussets 70 constitute together, the center section 27 of the glove.

At this time, it might be well to note that where tear seals are formed that the die electrodes are depressed deeper into the film or sheeting than where simple uniting welds are made. The outer edges of my die electrodes preferably take the form of simple welding dies and tear seal dies. Thus, as shown in FIGURE 15, which is a highly magnified view, the active edges of the electrodes include an outer tear seal forming die 72 and an adjacent simple weld surface 73. The tear seal edge 72 projects a distance beyond the plain weld edge 73 so that when the electrodes are brought toward one another the edges 72 will be depressed further into the film or sheeting and this edge will form the desired tear seal weld. The edge 73 not only constitutes means for forming a weld but also means for forming an ornamental depression 74 around the marginal edge of the glove and its fingers and this depression simulates a stitch line. Obviously, the two welds formed by the edges 72 and and 73 in the film or sheeting merge and in effect form a continuous seal.

Again, stress is laid on the floating press bed, as by the use of this bed independent seals are made on opposite sides of the glove and the upper and lower die electrodes operate against this floating bed. Thus, this floating press bed functions to perform a triple action, namely, (1) as a carrier for the gusset assembly; (2) as a complete floating press bed against which both upper and lower die electrodes operate, and (3) as means for preventing the welding of the back and palm sections or blanks together during the forming of the seals for the gussets.

Various changes in details may be made, without departing from the spirit of the invention or scope of the claims, but what I claim as new is:

1. The method of electronically welding a stacked assembly of tracks of thermoplastic film together to form a finished fingered glove which comprises providing a palm side, a thumb piece formation a back side, and a single intermediate gusset assembly for fingers and both glove sides formed from electronically weld sheets to define longitudinally extending elongated side flat sleeves forming outer side gussets for outer fingers and gussets for the sides of the palm and back sections and a plurality of short pockets having closed outer terminals forming inner gussets for end fingers and side gussets for intermediate fingers with tip gussets for all fingers, inserting a one-piece rigid floating press bed having elongated side prongs and intermediate short prongs into the sleeves and pockets, interposing the gusset assembly with the floating press bed between the palm and back sides and bringing exactly matching electronic die electrodes having spaced welding edges against the outer faces of the palm and back sides for co-acting against the opposite sides of the floating press bed to form independent tear welds and seals on opposite sides of the stacked assembly with intermediate portions of sleeves and pockets electronically welded by tear seals to the palm and back sides.

2. The method of electronically welding a stacked assembly of thermoplastic film to form a finished fingered glove as defined in claim 1, and finally tearing the stacked assembly along the tear seals.

3. The method of electronically welding a stacked assembly of tranks of thermoplastic film to form a finished fingered glove which comprises providing a palm side, a thumb piece formation, a back side and an intermediate single gusset assembly for all fingers and both sides of the glove arranged in superimposed relation with said gusset assembly interposed between the palm and back sides, a rigid floating press bed of a size and configuration to conform to the configuration of the gusset assembly having finger portions and side glove portions for both sides of the glove, inserting said press bed into said gusset assembly and inserting said gusset assembly and press bed between the palm and back sides, whereby the press bed is entirely covered by the gusset assembly and lies between the palm and back sides, and bringing exactly matching electronic die electrodes against the outer faces of the palm and back sides for co-action against the opposite sides of the floating press bed to form independent tear welds and seals on opposite sides of the stacked assembly of tranks.

4. The method of electronically welding a stacked assembly of tranks of thermoplastic film to form a finished fingered glove which comprises providing a palm side, a thumb formation piece, a back side and a preformed single gusset assembly for fingers and both glove sides, said gusset assembly including electronically welded sheets of a size and configuration to define longitudinally extending elongated side flat sleeves for both glove sides and a plurality of short flat pockets for fingers, inserting a rigid floating press bed having side prongs and intermediate short prongs in said gusset assembly and said press bed being of a size and configuration to conform to the side elongated sleeves and short pockets, whereby the floating press bed is entirely covered by the gusset assembly, said gusset assembly and floating press bed being inserted between the palm and back sides, said thumb formation piece being integral with and folded inwardly over said palm side, and bringing exactly matching die electrodes against the outer faces of the palm and back sides for co-acting against the opposite sides of the floating press bed to form independent tear seals and welds on opposite sides of the stacked assembly, with intermediate portions of the sleeves and pockets welded to inner faces of the palm and back sides with the independent welds separated by the floating press bed.

References Cited in the file of this patent
UNITED STATES PATENTS
2,970,317  Winson _____ Feb. 7, 1961